(12) United States Patent
Foschini et al.

(10) Patent No.: US 7,050,510 B2
(45) Date of Patent: May 23, 2006

(54) OPEN-LOOP DIVERSITY TECHNIQUE FOR SYSTEMS EMPLOYING FOUR TRANSMITTER ANTENNAS

(75) Inventors: Gerard J Foschini, Sayrerville, NJ (US); Constantinos B. Papadias, Westfeild, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 849 days.

(21) Appl. No.: 09/752,637

(22) Filed: Dec. 29, 2000

(65) Prior Publication Data

US 2002/0118770 A1    Aug. 29, 2002

(51) Int. Cl.
H04L 27/04 (2006.01)
H04B 7/02 (2006.01)

(52) U.S. Cl. ............................ 375/299; 455/101
(58) Field of Classification Search ............... 375/267, 375/299, 347, 295, 316, 130, 141, 144, 143, 375/146, 340, 262, 341, 152, 147, 148; 455/101, 455/39, 132, 137; 370/208, 335, 342, 441, 370/203
See application file for complete search history.

(56) References Cited

U.S. PATENT DOCUMENTS 6,317,411 B1 * 11/2001 Whinnett et al. ............ 370/204

(Continued)

FOREIGN PATENT DOCUMENTS

EP    0 905 920 A    3/1999

(Continued)

OTHER PUBLICATIONS

Bevan et .,"Space-Time Coding for Capacity Enhancement in Future Generation Wireless Communication Networks," IEE, 2000, pp 8/1-8/11.*

(Continued)

Primary Examiner—Tesfaldet Bocure
(74) Attorney, Agent, or Firm—Eugene J. Rosenthal

(57) ABSTRACT

When using four transmit antennas, conventional channel coding is employed for a decoupled space-time coding approach for each of a number, L, of data substreams derived from the overall source bit stream. The symbols of the data substreams, after any encoding, are processed and the resulting derivatives of the encoded data substreams, which includes at least the complex conjugate of one of the encoded symbols, are grouped to form four transmit time sequences each one spanning L symbol periods which form a transmission matrix B. Each row of the matrix corresponds to an antenna, and the elements of each row represent the samples of a temporal sequence that is emitted by the antenna in L symbol periods. When L=4 the matrix B can be arranged as follows:

$$\begin{array}{c} \phantom{Antenna 1} \begin{array}{cccc} T_1 & T_2 & T_3 & T_4 \end{array} \\ \begin{array}{c} \text{Antenna 1} \\ \text{Antenna 2} \\ \text{Antenna 3} \\ \text{Antenna 4} \end{array} \left[ \begin{array}{cccc} b_1 & b_2^* & b_3 & b_4^* \\ b_2 & -b_1^* & -b_4 & b_3^* \\ b_3 & b_4^* & -b_1 & -b_2^* \\ b_4 & -b_3^* & b_2 & -b_1^* \end{array} \right] \end{array}$$

where $b_1$, $b_2$, $b_3$, and $b_4$ are the encoded symbols from the data substreams and * indicates complex conjugate.

57 Claims, 2 Drawing Sheets

U.S. PATENT DOCUMENTS

| | | | |
|---|---|---|---|
| 6,594,473 B1 * | 7/2003 | Dabak et al. | 455/101 |
| 6,661,856 B1 * | 12/2003 | Calderbank et al. | 375/347 |
| 6,775,260 B1 * | 8/2004 | Dabak et al. | 370/342 |
| 6,778,612 B1 * | 8/2004 | Lozano et al. | 375/299 |
| 2001/0017903 A1 * | 8/2001 | Naguib et al. | 375/347 |
| 2002/0102950 A1 * | 8/2002 | Gore et al. | 455/101 |
| 2002/0106008 A1 * | 8/2002 | Guey | 375/148 |
| 2002/0122383 A1 * | 9/2002 | Wu et al. | 370/210 |
| 2002/0154705 A1 * | 10/2002 | Walton et al. | 375/267 |
| 2002/0172293 A1 * | 11/2002 | Kuchi et al. | 375/267 |

FOREIGN PATENT DOCUMENTS

| | | |
|---|---|---|
| EP | 001187363 A1 * | 3/2002 |
| WO | 00 14921 A | 3/2000 |
| WO | WO/01/50671 * | 12/2001 |

OTHER PUBLICATIONS

Hoyoung, "Space-Time Coding Base Transmit Diversity Using an Adaptive Precoder for WCDMA System," IEEE, 2001, pp. 452-455.*

Hong et al., "Adaptive Space-Time Transmit Diversity For MIMO System,"IEEE, 2003, pp. 1070-1073.*

Tarokh, et al.: "Space-time Block Codes From Orthogonal Designs", IEEE Transactions On Information Theory, vol. 45, No. 5, Jul., 1999, pp. 1456-1467, XP002161393, IEEE, New York, US.

Papadias, C.B. et al.: "A Space-time Coding Approach for Systems Employing Four Transmit Antennas", 2001 IEEE International Conference on Acoustics, Speech, and Signal Processing, Salt Lake City, Utah, USA, vol. 4, May 7-11, 2001, pp. 2481-2484, XP002195791.

* cited by examiner

OPEN-LOOP DIVERSITY TECHNIQUE FOR SYSTEMS EMPLOYING FOUR TRANSMITTER ANTENNAS

TECHNICAL FIELD

This invention relates to the art of wireless communications, and more particularly, to wireless communication systems using multiple antennas at the transmitter and one or more antennas at the receiver.

BACKGROUND OF THE INVENTION

It is known in the art that systems using multiple antennas at the transmitter and one or more antennas at the receiver can achieve dramatically improved capacity, i.e., the maximum bits/second/hertz with error free communication, as compared to single transmitter antenna systems. It is also known in the art that if a channel estimate, or channel statistics based on the channel estimate, are fed back to the transmitter, then the throughput of the channel can be improved with respect to an identically configured system but without feedback. However, because in systems with multiple transmit antennas the overall channel is actually made up of multiple channels, with one channel for each transmit and receive antenna pairing, such feedback requires considerable bandwidth, and it is undesirable to dedicate so much bandwidth to feedback. Also, for fast changing wireless channels, the feedback may not arrive at a fast enough rate in order to be useful.

In order to achieve the maximum open loop capacity of a multiple transmit antenna system, it is necessary to employ channel coding. The state of the art of channel coding, e.g., turbo codes, trellis codes and the like, is typically spatially one dimensional, i.e., they are designed for only a single transmit antenna. Generally, it is not immediately obvious how one could employ such coding in a spatially multi-dimensional, e.g., multiple transmit antenna, system. In the case of two transmit antennas and one receive antenna, it was recognized that each of the data substreams could be independently coded using known channel coding techniques to achieve maximum capacity if so-called "space-time spreading" was used. See for example, U.S. patent application Ser. No. 09/285,578 entitled Space-Time Spreading Method Of CDMA Wireless Communication.

SUMMARY OF THE INVENTION

We have recognized that it is possible to employ conventional channel coding when using four transmit antennas, by using a decoupled space-time coding approach for each of a number, L, of data substreams that are derived from the overall source bit stream. To this end symbols, which are samples of the data substreams after encoding, if any, are processed so that the resulting derivatives thereof, which includes at least the complex conjugate of one of the symbols, are grouped to form four transmit time sequences each spanning L symbol periods. The four time sequences may be viewed as forming a transmission matrix B. Each row of the matrix corresponds to a transmit element, e.g., an antenna, and the elements of each row represent the samples of a temporal sequence that is emitted by the antenna in L symbol periods. In one embodiment of the invention, the number of data substreams L is equal to four, the number of antennas. The overall symbol rate for each antenna is the same as the symbol rate of the original overall source bit stream. In accordance with the principles of the invention, the matrix B is arranged as follows:

$$\begin{array}{c} \phantom{Antenna 1} \begin{array}{cccc} T_1 & T_2 & T_3 & T_4 \end{array} \\ \begin{array}{c} \text{Antenna 1} \\ \text{Antenna 2} \\ \text{Antenna 3} \\ \text{Antenna 4} \end{array} \left[ \begin{array}{cccc} b_1 & b_2^* & b_3 & b_4^* \\ b_2 & -b_1^* & -b_4 & b_3^* \\ b_3 & b_4^* & -b_1 & -b_2^* \\ b_4 & -b_3^* & b_2 & -b_1^* \end{array} \right] \end{array}$$

where $b_1$, $b_2$, $b_3$, and $b_4$ are the symbols, which may be encoded samples, derived from data substreams 1, 2, 3, and 4, respectively, and * indicates complex conjugate. As indicated, the rows of the matrix represent the different antennas, while the columns represent different symbol periods ($T_i$, i=1 . . . 4).

This approach may be used in systems that employ direct sequence spreading, e.g., code division multiple access (CDMA) systems. In such systems, each entry of the matrix is modulated, i.e., multiplied, by an orthogonal spreading code sequence represented by one of horizontal vectors $\bar{c}_l$, l=1 . . . , L, each of which spans 1 symbol period and contains N chips, where N is the spreading gain.

In a receiver, the received signal is first applied to a bank of L correlators, where despreading, in the case of a spread spectrum signal, or otherwise the simpler version thereof, temporal subsampling, is performed, producing L preprocessed sequences. The preprocessed sequences are further processed, either jointly or individually, to ultimately develop a reconstructed version of the source bit stream.

Advantageously, using this methodology, the samples of the data substreams may be encoded, as indicated, prior to being incorporated into the matrix using conventional coding techniques, e.g., turbo coding, and the advantages of such coding may be exploited at the receiver. Further advantageously, the coding of each of the data substreams is independent of, i.e., decoupled from, the coding of any of the other data substreams.

DETAILED DESCRIPTION

Figure 1:
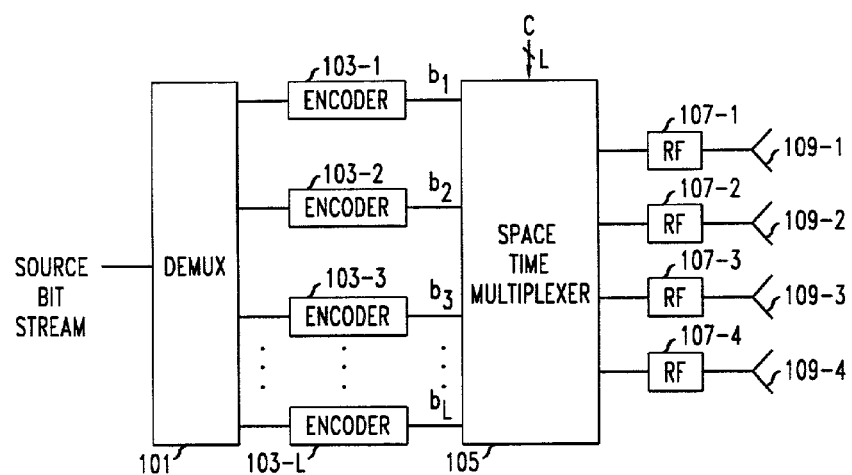
FIG. 1 shows an exemplary transmitter arranged in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

FIG. 1 shows an exemplary transmitter arranged in accordance with the principles of the invention. The transmitter of FIG. 1 uses a decoupled space-time coding approach for each of a number, L, of data substreams that are derived from a source bit stream. The L data substreams are processed so that they may be transmitted via four transmit antennas. Advantageously, each data substream employ conventional channel coding.

FIG. 1 shows a) demultiplexer (DEMUX) 101; b) encoders 103, including encoders 103-1 through 103-L; c) space time multiplexer 105; d) radio frequency (RF) units 107, including RF units 107-1 through 107-4; and e) antennas 109, including antennas 109-1 through 109-4.

Demultiplexer 101 divides the source bit stream it receives as an input into L data substreams. Each of the L data substreams supplied as an output by demultiplexer 101 is optionally encoded by a respective one of optional encoders 103 to produce encoded data substreams. Advantageously, encoders 103 may employ conventional channel coding, such as turbo coding. Encoders 103 may also perform digital modulation, e.g., mapping the samples to a discrete alphabet prior to doing the actual encoding. The encoded data substreams are supplied to space time multiplexer 105.

Each sample supplied as an output by one of encoders 103, or by demultiplexer 101 in the event encoders 103 are omitted, is referred to herein as a symbol. The time duration of a symbol is referred to as a symbol period.

Every symbol period, space time multiplexer 105, processes the symbols of each of the encoded data substreams supplied by encoders 103 so as to form four transmit time sequences, each time sequence spanning at least L symbol periods. Each of the symbols is processed to develop its complex conjugate. In one embodiment of the invention, where L=4, the four symbols, their complex conjugates, the negative of the symbols and the negative of the complex conjugates are arranged by space time multiplexer 105 to form a matrix B. Each row of matrix B corresponds to one of antennas 109. More specifically, the elements of each row represent the samples of a temporal sequence that is emitted by the corresponding one of antennas 109 in L symbol periods, unless direct sequence spreading is used, as described further hereinbelow.

In such an embodiment of the invention, the matrix B is arranged as follows:

$$\begin{array}{c} & T1 & T2 & T3 & T4 \\ \text{Antenna 1} \\ \text{Antenna 2} \\ \text{Antenna 3} \\ \text{Antenna 4} \end{array} \begin{bmatrix} b_1 & b_2^* & b_3 & b_4^* \\ b_2 & -b_1^* & -b_4 & b_3^* \\ b_3 & b_4^* & -b_1 & -b_2^* \\ b_4 & -b_3^* & b_2 & -b_1^* \end{bmatrix}$$

where $b_1$, $b_2$, $b_3$, and $b_4$ are the symbols from the encoded data substreams supplied as outputs from encoders 103-1, 103-2, 103-3, and 103-4, respectively, and * indicates complex conjugate. As indicated, the rows of matrix B represent the different antennas, while the columns represent different symbol periods (Ti, i=1 . . . 4).

In the event that the inventive technique is employed in a system that employs direct sequence spreading, e.g., code division multiple access (CDMA) system, space time multiplexer 105 further multiplies each element of the $l^{th}$ column, l=1 . . . L, of an unspread matrix B by a spreading code sequence represented by $\bar{c}_l$, which spans 1 symbol period and contains N chips, where N is the spreading gain. The set $\bar{c}_l$, l=1 . . . L, may be orthogonal. Thus, the spread matrix B, which is transmitted, becomes $$\begin{bmatrix} b_1\bar{c}_1 & b_2^*\bar{c}_2 & b_3\bar{c}_3 & b_4^*\bar{c}_4 \\ b_2\bar{c}_1 & -b_1^*\bar{c}_2 & -b_4\bar{c}_3 & b_3^*\bar{c}_4 \\ b_3\bar{c}_1 & b_4^*\bar{c}_2 & -b_1\bar{c}_3 & -b_2^*\bar{c}_4 \\ b_4\bar{c}_1 & -b_3^*\bar{c}_2 & b_2\bar{c}_3 & -b_1^*\bar{c}_4 \end{bmatrix}$$

Each of the time sequences developed by space time multiplexer 105 are supplied as an input to a respective one of radio frequency (RF) units 107, each of which performs all the necessary processing to convert its respective input from baseband to a radio frequency modulated signal. Each of the radio frequency modulated signal developed by each of RF units 107 is supplied to a respective one of antennas 109 from which it is transmitted.

Figure 2:
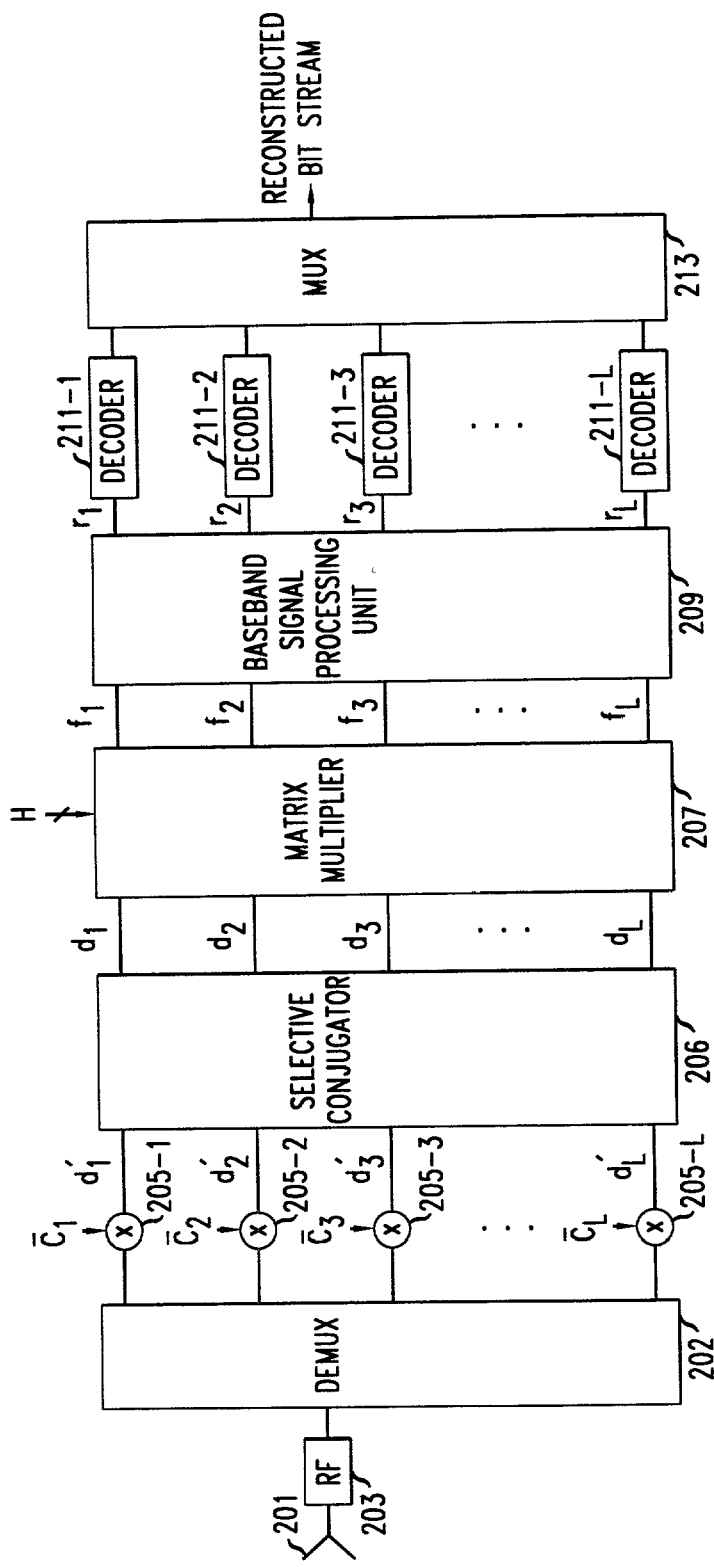
FIG. 2 shows an exemplary embodiment of a receiver arranged in accordance with the principles of the invention.

Note that although antennas are shown in FIG. 1, any form of transmit element may be employed, e.g., a light source. Further note that although radio frequency units are shown in FIG. 1, in other embodiments of the invention, e.g., those using light for communicating the transmitted signal, different modulators may be employed FIG. 2 shows an exemplary embodiment of a receiver arranged in accordance with the principles of the invention. FIG. 2 shows a) antenna 201; b) radio frequency (RF) units 203; c) demultiplexer 202; d) correlator 205-1 through 205-L; e) selective conjugator 206, f) matrix multiplier 207; g) baseband signal processing unit 209; h) optional decoders 211, including decoders 211-1 through 211-L; and i) multiplexer 213.

Antenna 201 receives the signals transmitted by all of antennas 109 (FIG. 1) and supplies an electrical version thereof to RF unit 203 (FIG. 2). RF unit 203 converts the radio frequency signal supplied to it by antenna 201 to a baseband version thereof.

Demultiplexer (demux) 202 performs subsampling, i.e., it divides the received baseband signal into L portions in time, and supplies one portion to each respective one of L outputs to form data substreams which are supplied to optional correlators 205 or directly to respective inputs of selective conjugator 206.

In the event that the inventive technique is employed in a system that employs direct sequence spreading, e.g., a code division multiple access (CDMA) system, each of optional correlators 205 is supplied with a respective one of an orthogonal spreading code sequence represented as a horizontal vector $\bar{c}_l$, l=1 . . . , L where each of orthogonal spreading code sequences $\bar{c}_l$, spans 1 symbol period and contains N chips, where N is the spreading gain. Thus, correlators 205 perform despreading which is the inverse of the spreading performed in space time multiplexer 105, and each supplies as an output a despread data substream which is supplied to selective conjugator 206.

Selective conjugator 206 determines the complex conjugate of any of the outputs $d_1'$ of demultiplexer 202 or optional correlators 205 that is required to ensure that the system is not over parametrized. In other words, there should only be one form of each symbol that is being sought in the system of linear equations that describes the input to matrix multiplier 207. This system of linear equations is generally represented, when the channel is a flat-faded channel and in the absence of noise, as d=Hb, where d is the vertical vector that is the output of selective conjugator 206, H is a matrix of derivatives of channel coefficients $h_1$, $h_2$, $h_3$, and $h_4$, b is a vertical vector formed from $b_1$, $b_L$, i.e., if symbol $b_1$ appears in b, then $b_1^*$ should not appear. This is necessary in order that the inputs to matrix multiplier 207 be a linear function of only the symbols $b_i$, i=1 . . . L.

For example, if L=4 and matrix B is arranged in the manner described hereinabove, i.e., $$\begin{bmatrix} b_1 & b_2^* & b_3 & b_4^* \\ b_2 & -b_1^* & -b_4 & b_3^* \\ b_3 & b_4^* & -b_1 & -b_2^* \\ b_4 & -b_3^* & b_2 & -b_1^* \end{bmatrix}$$

then $d = \begin{bmatrix} d_1' \\ d_2'^* \\ d_3' \\ d_4'^* \end{bmatrix} = \begin{bmatrix} h_1 & h_2 & h_3 & h_4 \\ -h_2^* & h_1^* & -h_4^* & h_3^* \\ -h_3 & h_4 & h_1 & -h_2 \\ -h_4^* & -h_3^* & h_2^* & h_1^* \end{bmatrix} \begin{bmatrix} b_1 \\ b_2 \\ b_3 \\ b_4 \end{bmatrix}$ so it is necessary to complex conjugate $d_2'$ and $d_4'$ to develop d=Hb.

Matrix multiplier 207 operates on the received vertical vector d to produce L match filtered outputs. To this end, matrix multiplier 207 also receives, or derives, an L by L matrix $H^\dagger$, where † denotes complex conjugate transpose, also known as Hermitian transpose. In an embodiment of the invention where L is 4. H, as noted above, is the following matrix $$\begin{bmatrix} h_1 & h_2 & h_3 & h_4 \\ -h_2^* & h_1^* & -h_4^* & h_3^* \\ -h_3 & h_4 & h_1 & -h_2 \\ -h_4^* & -h_3^* & h_2^* & h_1^* \end{bmatrix}$$

where $h_i$ is the complex channel coefficient from the $i^{th}$ transmit antenna to the receiver antenna assuming all the channels are flat faded channels. The matrix $H^\dagger$, multiplies from the left the L by 1 vertical vector d formed by the outputs of correlators 205 to produce a new L by 1 vertical vector f whose L entries are the inputs to baseband signal processing unit 209, i.e., $f=H^\dagger d$.

The L match filtered outputs are supplied to baseband signal processing unit 209 in order to extract therefrom L data substreams. In various embodiments of the invention, in baseband signal processing unit 209 a specified matrix W multiplies from the left vertical vector f to produce a new L by 1 vertical vector r, so that r=Wf. In one embodiment of the invention, a decorrelating process, also known as zero forcing, is employed in which the matrix $W=K^{-1}$ is computed, where $K=H^\dagger H$. In one embodiment of the invention, $W=K^\dagger(K K^\dagger + \lambda K)^{-1}$, where λ is a real scalar. More particularly, λ may be equal to $\sigma_n^2/\sigma_b^2$ where $\sigma_n^2$ is the channel noise variance and $\sigma_b^2$ is the variance of of $b_i$, where i=1 . . . L. Such a receiver is known as a minimum mean squared error (MMSE) receiver.

In accordance with an aspect of the invention, in performing the multiplication in baseband signal processing unit 209 when L=4 for the foregoing embodiments, it is possible to speed up the calculations with no loss in accuracy by subdividing the matrix multiplication process into two portions, the first portion using the first and third element of vertical vector f and the second portion using the fourth and second element of vertical vector f, specifically in that order. A particular 2×2 matrix that is employed for the multiplication from the left for both portions is derived as follows. First derive 2×2 matrix K' which corresponds to deleting the second and fourth rows and columns of 4×4 matrix K. Then, determine 2×2 matrix W' using the same process by which W is derived from K, but employing K' in lieu of K for the respective processing desired, e.g., zero forcing or MMSE.

In other embodiments of the invention, baseband signal processing unit 209 may employ non-linear processing techniques, such as non-linear multi-user detection, including maximum likelihood multi-user detection and interference cancellation. Such non-linear processing techniques may also employ the partitioning technique described above to reduce computational complexity without sacrificing accuracy.

Each of the L data substreams is then, optionally, decoded by a respective one of optional decoders 211 to which it is supplied. The decoding performed by decoders 111 advantageously is the inverse of that performed by encoders 103, and as such they may also perform digital demodulation.

Note that in other embodiments of the invention the decoding process may be combined with the processing of baseband signal processing unit 209. In such embodiments of the invention, it is possible to perform joint decoding, i.e., decoding using information from more than one data stream. Such embodiments of the invention may be especially suitable for the use of non-linear processing techniques in baseband signal processing unit 209. Furthermore, note that decoding may be eliminated entirely if no encoders 103 (FIG. 1) were included in the transmitter.

The decoded L data substreams are then supplied as an input to multiplexer (MUX) 213 (FIG. 2) which interleaves them in the inverse pattern of DEMUX 101 to reconstruct the source bit stream.

In other embodiments of the invention, the functionality of matrix multiplier 207 may be absorbed into the processing performed by baseband signal processing unit 209. In yet further embodiments of the invention, the functionality of matrix multiplier 207 may be eliminated.

Note that the decision functionality which is that part of the process which selects the closest constellation point may be performed in either baseband signal processing unit 209, in decoders 211, or distributed across both at the discretion of the implementor based on the particular decoding selected. Furthermore, the particular algorithm employed to achieve the decision functionality is at discretion of the implementor.

Advantageously, using this methodology, the samples of the data substreams may be encoded, as indicated, prior to being incorporated into the matrix using conventional coding techniques, e.g., turbo coding, and the advantages of such coding may be exploited at the receiver. Further advantageously, the coding of each of the data substreams is independent of, i.e., decoupled from, the coding of any of the other data substreams.

In another embodiment of the invention, where L=4, the matrix B is arranged as follows:

$$\begin{bmatrix} b_1 & b_2^* & b_3 & b_4^* \\ -b_2 & b_1^* & b_4 & -b_3^* \\ b_3 & b_4^* & -b_1 & -b_2^* \\ -b_4 & b_3^* & -b_2 & b_1^* \end{bmatrix}$$

where $b_1$, $b_2$, $b_3$, and $b_4$ are the symbols from the encoded data substreams supplied as outputs from encoders 103-1 (FIG. 1), 103-2, 103-3, and 103-4, respectively, and * indicates complex conjugate. Similarly, in another embodiment of the invention, the transpose of the immediately preceding matrix B, i.e., $$\begin{bmatrix} b_1 & -b_2 & b_3 & -b_4 \\ b_2^* & b_1^* & b_4^* & b_3^* \\ b_3 & b_4 & -b_1 & -b_2 \\ b_4^* & -b_3^* & -b_2^* & b_1^* \end{bmatrix}$$

may be employed.

In another embodiment of the invention, where L=4, the matrix B is arranged as follows:

$$\begin{bmatrix} b_1 & b_2 & b_3 & b_4 \\ b_2^* & -b_1^* & b_4^* & -b_3^* \\ b_3 & -b_4 & -b_1 & b_2 \\ b_4^* & b_3^* & -b_2^* & -b_1^* \end{bmatrix}$$

where $b_1$, $b_2$, $b_3$, and $b_4$ are the symbols from the encoded data substreams supplied as outputs from encoders 103-1 (FIG. 1), 103-2, 103-3, and 103-4, respectively, and * indicates complex conjugate.

It will be readily recognized by those of ordinary skill in the art that in lieu of starting the process with the set of $b_1$, $b_2$, $b_3$, and $b_4$, any other set of derivatives of $b_1$, $b_2$, $b_3$, and $b_4$ may be employed by the implementor, with corresponding changes made throughout the process. Furthermore, the ordering of the derivatives of the substreams is also solely at the discretion of the implementor, again with corresponding changes made throughout the process. Thus, for example, one may select to use the set $b_4$, $b_1^*$, $-b_2$, $b_3$.

Those of ordinary skill in the art of non-flat faded channels will be able to apply the techniques of the invention for use with non-flat faded channels.

In another embodiment of the invention, multiple receive elements are employed. The symbols are reconstructed for each of the data substreams developed at each receive element in the manner described hereinabove. They may then be combined to develop an improved estimate of the original symbol. Such combination may be achieved, for example, by averaging values for each corresponding symbol.

What is claimed is:

1. A method for use in a transmitter adapted to employ four transmit elements to transmit a source bit stream, the method comprising the steps of:
   dividing said source bit stream into L data substreams, L>2; and
   grouping derivatives of symbols derived from each of said data substreams to form four transmit time sequences, one sequence for each transmit element, said derivatives of said symbols are members of the group consisting of: a negative of one of said symbols, a negative of a complex conjugate of one of said symbols, one of said symbols, a symbol developed by encoding at least one sample of at least one of said data substreams, and an unencoded sample of at least one of said data substreams;
   wherein
   each of said time sequences spans L symbol periods and includes at least one derivative of at least one symbol from each of said L data substreams; and
   at least one of said derivatives of said symbols is a complex conjugate of one of said symbols.

2. The invention as defined in claim 1 wherein L=4 and said time sequences are arranged according to a matrix, each time sequence being a row of said matrix and being transmitted by a respective one of said transmit elements, said matrix being arranged as one of the matrices of the set of matrices consisting of $$\begin{bmatrix} b_1 & b_2^* & b_3 & b_4^* \\ b_2 & -b_1^* & -b_4 & b_3^* \\ b_3 & b_4^* & -b_1 & -b_2^* \\ b_4 & -b_3^* & b_2 & -b_1^* \end{bmatrix}, \begin{bmatrix} b_1 & b_2^* & b_3 & b_4^* \\ -b_2 & b_1^* & b_4 & -b_3^* \\ b_3 & b_4^* & -b_1 & -b_2^* \\ -b_4 & b_3^* & -b_2 & b_1^* \end{bmatrix},$$

$$\begin{bmatrix} b_1 & -b_2 & b_3 & -b_4 \\ b_2^* & b_1^* & b_4^* & b_3^* \\ b_3 & b_4 & -b_1 & -b_2 \\ b_4^* & -b_3^* & -b_2^* & b_1^* \end{bmatrix}, \text{ and } \begin{bmatrix} b_1 & b_2 & b_3 & b_4 \\ b_2^* & -b_1^* & b_4^* & -b_3^* \\ b_3 & -b_4 & -b_1 & b_2 \\ b_4^* & b_3^* & -b_2^* & -b_1^* \end{bmatrix}$$

where:

$b_1$, $b_2$, $b_3$, and $b_4$ are said symbol derivatives from data substreams 1, 2, 3 and 4, respectively, and

* indicates complex conjugate.

3. The invention as defined in claim 1 wherein at least one of said groups of derivatives of said symbols includes derivatives of symbols from more than one of said data substreams.

4. The invention as defined in claim 1 further comprising the step of repeating said dividing and grouping steps.

5. The invention as defined in claim 1 wherein each row of said matrix represents what is transmitted by a respective one of said transmit elements.

6. The invention as defined in claim 1 wherein at least one of said transmit elements is an antenna.

7. The invention as defined in claim 1 wherein L=4 and said time sequences are spread and arranged according to a matrix, each spread time sequence being a row of said matrix and being transmitted by a respective one of said transmit elements, said matrix being arranged as follows:

$$\begin{bmatrix} b_1\bar{c}_1 & b_2^*\bar{c}_2 & b_3\bar{c}_3 & b_4^*\bar{c}_4 \\ b_2\bar{c}_1 & -b_1^*\bar{c}_2 & -b_4\bar{c}_3 & b_3^*\bar{c}_4 \\ b_3\bar{c}_1 & b_4^*\bar{c}_2 & -b_1\bar{c}_3 & -b_2^*\bar{c}_4 \\ b_4\bar{c}_1 & -b_3^*\bar{c}_2 & b_2\bar{c}_3 & -b_1^*\bar{c}_4 \end{bmatrix}$$

where:

$b_1$, $b_2$, $b_3$, and $b_4$ are said symbol derivatives from data substreams 1, 2, 3, and 4, respectively;

* indicates complex conjugate; and $\bar{c}_l$, l=1 . . . , L are each horizontal vectors of a spreading code, each of said horizontal vectors spans 1 symbol period and contains N chips, where N is the spreading gain.

8. A transmitter adapted for use with four transmit elements to transmit a source bit stream, comprising:

means for dividing said source bit stream into L data substreams, L>2;

means grouping derivatives of symbols derived from each of said data substreams to form four transmit time sequences, said derivatives of said symbols are members of the group consisting of: a negative of one of said symbols, a negative of a complex conjugate of one of said symbols, one of said symbols, a symbol developed by encoding at least one sample of at least one of said data substreams, and an unencoded sample of at least one of said data substreams; and means for grouping said time sequences into a matrix, each time sequence being a row of said matrix;

wherein each of said time sequences spans L symbol periods, and includes at least one derivative of at least one symbol from each of said L data substreams; and at least one of said derivatives of said symbols is a complex conjugate of one of said symbols.

9. The invention as defined in claim 8 further comprising L means for encoding each of said data substreams prior to symbols of said data substreams being grouped by said means for grouping, so that said encoded data substreams are grouped by said means for grouping.

10. The invention as defined in claim 8 wherein L=4 and said time sequences are arranged according to a matrix, each time sequence being a row of said matrix and being transmitted by a respective one of said transmit elements, said matrix being arranged as one of the matrices of the set of matrices consisting of $$\begin{bmatrix} b_1 & b_2^* & b_3 & b_4^* \\ b_2 & -b_1^* & -b_4 & b_3^* \\ b_3 & b_4^* & -b_1 & -b_2^* \\ b_4 & -b_3^* & b_2 & -b_1^* \end{bmatrix}, \begin{bmatrix} b_1 & b_2^* & b_3 & b_4^* \\ -b_2 & b_1^* & b_4 & -b_3^* \\ b_3 & b_4^* & -b_1 & -b_2^* \\ -b_4 & b_3^* & -b_2 & b_1^* \end{bmatrix},$$

$$\begin{bmatrix} b_1 & -b_2 & b_3 & -b_4 \\ b_2^* & b_1^* & b_4^* & b_3^* \\ b_3 & b_4 & -b_1 & -b_2 \\ b_4^* & -b_3^* & -b_2^* & b_1^* \end{bmatrix}, \text{ and } \begin{bmatrix} b_1 & b_2 & b_3 & b_4 \\ b_2^* & -b_1^* & b_4^* & -b_3^* \\ b_3 & -b_4 & -b_1 & b_2 \\ b_4^* & b_3^* & -b_2^* & -b_1^* \end{bmatrix}$$

where:

$b_1$, $b_2$, $b_3$, and $b_4$ are said symbol derivatives from data substreams 1, 2, 3, and 4, respectively, and

* indicates complex conjugate.

11. The invention as defined in claim 8 wherein L=4 and said time sequences are spread and arranged according to a matrix, each spread time sequence being a row of said matrix and being transmitted by a respective one of said transmit elements, said matrix being arranged as follows:

$$\begin{bmatrix} b_1\bar{c}_1 & b_2^*\bar{c}_2 & b_3\bar{c}_3 & b_4^*\bar{c}_4 \\ b_2\bar{c}_1 & -b_1^*\bar{c}_2 & -b_4\bar{c}_3 & b_3^*\bar{c}_4 \\ b_3\bar{c}_1 & b_4^*\bar{c}_2 & -b_1\bar{c}_3 & -b_2^*\bar{c}_4 \\ b_4\bar{c}_1 & -b_3^*\bar{c}_2 & b_2\bar{c}_3 & -b_1^*\bar{c}_4 \end{bmatrix}$$

where:

$b_1$, $b_2$, $b_3$, and $b_4$ are said symbol derivatives from data substreams 1, 2, 3, and 4, respectively;

* indicates complex conjugate; and $\bar{c}_l$, l=1 . . . , L are each horizontal vectors of a spreading code, each of said horizontal vectors spans 1 symbol period and contains N chips, where N is the spreading gain.

12. The invention as defined in claim 8 wherein each row of said matrix represents what is transmitted by a respective one of said transmit elements.

13. The invention as defined in claim 8 wherein at least one of said transmit elements is an antenna.

14. A transmitter for use with four transmit elements for transmitting a source bit stream, comprising:

a demultiplexer that divides said source bit stream into L data substreams, L>2; and a space time multiplexer that groups derivatives of symbols derived from of each of said data sub streams to form four transmit time sequences, each of said time sequences;

wherein said derivatives of said symbols are one of the group consisting of: a negative of one of said symbols, a negative of a complex conjugate of one of said symbols, one of said symbols, a symbol developed by encoding at least one sample of at least one of said data substreams, and an unencoded sample of at least one of said data substreams;

each of said time sequences spans L symbol periods, at least one of said derivatives of said symbols is a complex conjugate of one of said symbols; and said time sequences groups are arranged as a matrix, in which each time sequence is a row of said matrix.

15. The invention as defined in claim 14 further comprising a plurality of radio frequency, each of which converts a respective one of said time sequences groups which it receives as an input from baseband to a radio frequency modulated signal.

16. The invention as defined in claim 14 further comprising at least one encoder interposed between said demultiplexer and said space time multiplexer.

17. The invention as defined in claim 14 wherein said space time multiplexer applies a spreading code to said symbols.

18. The invention as defined in claim 14 wherein each row of said matrix represents what is transmitted by a respective one of said transmit elements.

19. The invention as defined in claim 14 wherein at least one of said transmit elements is an antenna.

20. The invention as defined in claim 14 wherein L=4 and said time sequences are arranged according to a matrix, each time sequence being a row of said matrix and being transmitted by a respective one of said transmit elements, said matrix being arranged as one of the matrices of the set of matrices consisting of $$\begin{bmatrix} b_1 & b_2^* & b_3 & b_4^* \\ b_2 & -b_1^* & -b_4 & b_3^* \\ b_3 & b_4^* & -b_1 & -b_2^* \\ b_4 & -b_3^* & b_2 & -b_1^* \end{bmatrix}, \begin{bmatrix} b_1 & b_2^* & b_3 & b_4^* \\ -b_2 & b_1^* & b_4 & -b_3^* \\ b_3 & b_4^* & -b_1 & -b_2^* \\ -b_4 & b_3^* & -b_2 & b_1^* \end{bmatrix},$$

$$\begin{bmatrix} b_1 & -b_2 & b_3 & -b_4 \\ b_2^* & b_1^* & b_4^* & b_3^* \\ b_3 & b_4 & -b_1 & -b_2 \\ b_4^* & -b_3^* & -b_2^* & b_1^* \end{bmatrix}, \text{ and } \begin{bmatrix} b_1 & b_2 & b_3 & b_4 \\ b_2^* & -b_1^* & b_4^* & -b_3^* \\ b_3 & -b_4 & -b_1 & b_2 \\ b_4^* & b_3^* & -b_2^* & -b_1^* \end{bmatrix}$$

where:

$b_1$, $b_2$, $b_3$, and $b_4$ are said symbol derivatives from data substreams 1, 2, 3, and 4, respectively, and

* indicates complex conjugate.

21. The invention as defined in claim 14 wherein L=4 and said time sequences are spread and arranged according to a matrix, each spread time sequence being a row of said matrix and being transmitted by a respective one of said transmit elements, said matrix being arranged as follows:

$$\begin{bmatrix} b_1\overline{c}_1 & b_2^*\overline{c}_2 & b_3\overline{c}_3 & b_4^*\overline{c}_4 \\ b_2\overline{c}_1 & -b_1^*\overline{c}_2 & -b_4\overline{c}_3 & b_3^*\overline{c}_4 \\ b_3\overline{c}_1 & b_4^*\overline{c}_2 & -b_1\overline{c}_3 & -b_2^*\overline{c}_4 \\ b_4\overline{c}_1 & -b_3^*\overline{c}_2 & b_2\overline{c}_3 & -b_1^*\overline{c}_4 \end{bmatrix}$$

where:

$b_1$, $b_2$, $b_3$, and $b_4$ are said symbol derivatives from data substreams 1, 2, 3, and 4, respectively;

* indicates complex conjugate; and $\overline{c}_l$, l=1 . . . , L are each horizontal vectors of a spreading code, each of said horizontal vectors spans 1 symbol period and contains N chips, where N is the spreading gain.

22. A transmitter adapted for use with four transmit elements to transmit a source bit stream, comprising:

a demultiplexer that divides said source bit stream into L data substreams, L>2;

L encoders, each of said encoders receiving and encoding one of said data substreams to produce encoded symbols;

a space time multiplexer that groups derivatives of said encoded symbols derived from each of said data substreams to form four transmit time sequences;

wherein said derivatives of said symbols are members of the group consisting of: a negative of one of said symbols, a negative of a complex conjugate of one of said symbols, one of said symbols, a symbol developed by encoding at least one sample of at least one of said data substreams, and an unencoded sample of at least one of said data substreams;

each of said time sequences respectively spans L symbol periods and includes at least one derivative of at least one symbol from each of said L data substreams, at least one of said derivatives of said symbols being a complex conjugate of one of said symbols; and said time sequences groups are arranged as a matrix, in which each time sequence is a row of said matrix.

23. The invention as defined in claim 22 wherein L=4 and said time sequences are arranged according to a matrix, each time sequence being a row of said matrix and being transmitted by a respective one of said transmit elements, said matrix being arranged as follows:

$$\begin{bmatrix} b_1 & b_2^* & b_3 & b_4^* \\ b_2 & -b_1^* & -b_4 & b_3^* \\ b_3 & b_4^* & -b_1 & -b_2^* \\ b_4 & -b_3^* & b_2 & -b_1^* \end{bmatrix}$$

where:

$b_1$, $b_2$, $b_3$, and $b_4$ are said symbol derivatives from data substreams 1, 2, 3, and 4, respectively, and

* indicates complex conjugate.

24. The invention as defined in claim 22 further comprising a plurality of radio frequency, each of which converts a respective one of said time sequences groups which it receives as an input from baseband to a radio frequency modulated signal.

25. The invention as defined in claim 22 wherein said space time multiplexer applies a spreading code to said symbols.

26. The invention as defined in claim 22 wherein each row of said matrix represents what is transmitted by a respective one of said transmit elements.

27. The invention as defined in claim 22 wherein at least one of said transmit elements is an antenna.

28. A method for use in processing received signals that were transmitted via four transmit elements of a transmitter, said transmitter being adapted to transmit a source bit stream by dividing said source bit stream into L data substreams, L>2 and grouping derivatives of symbols derived from each of said data substreams to form four transmit time sequences, one sequence for each transmit element, said derivatives of said symbols are members of the group consisting of: a negative of one of said symbols, a negative of a complex conjugate of one of said symbols, one of said symbols, a symbol developed by encoding at least one sample of at least one of said data substreams, an unencoded sample of at least one of said data substreams; each of said time sequences spanning L symbol periods and including at least one derivative of at least one symbol from each of said L data substreams, at least one of said derivatives of said symbols being a complex conjugate of one of said symbols, said method comprising the step of:

developing, from a received signal including versions of said time sequences which have been combined by the channel between said transmit elements and said receiver, reconstructed versions of said symbols derived from each of said data substreams.

29. The invention as defined in claim 28 wherein said developing step further comprises the step of developing reconstructed versions of said groups of derivatives of said symbols.

30. The invention as defined in claim 28 further comprising the step of developing reconstructed versions of said L data substreams from said reconstructed versions of said symbols.

31. The invention as defined in claim 28 further comprising the step of multiplexing reconstructed versions of said L data substreams to form a data version of said source bit stream.

32. The invention as defined in claim 28 further comprising the step of developing reconstructed versions of said L data substreams from said reconstructed versions of said symbols by decoding said reconstructed versions of said symbols to produce samples of said reconstructed versions of said L data substreams.

33. The invention as defined in claim 28 wherein said developing step further comprises the step of despreading said received versions of said time sequences.

34. The invention as defined in claim 28 wherein said developing step further comprises the step of subsampling said received versions of said time sequences.

35. The invention as defined in claim 28 wherein said developing step further comprises the step of match filtering derivatives of said received versions of said time sequences.

36. The invention as defined in claim 28 wherein said developing step further comprises the step of decorrelating said received versions of said time sequences.

37. The invention as defined in claim 28 wherein said developing step further comprises performing minimum mean squared error processing.

38. The invention as defined in claim 28 further comprising the steps of:

developing, from a second received signal including versions of said time sequences which have been combined by the channel between said transmit elements and said receiver, second reconstructed versions of said symbols derived from each of said data substreams; and combining said reconstructed versions and said second reconstructed versions to produce final versions of said symbols.

39. Apparatus for use in processing received signals that were transmitted via four transmit elements of a transmitter, said transmitter being adapted to transmit a source bit stream by dividing said source bit stream into L data substreams, L>2 and grouping derivatives of symbols derived from each of said data substreams to form four transmit time sequences, one sequence for each transmit element, each of said time sequences spanning L symbol periods, at least one of said derivatives of said symbols being a complex conjugate of one of said symbols, said apparatus comprising:

a matrix multiplier for supplying as an output matched filtered signals which are versions of preprocessed signals derived from a received signal which includes versions of said time sequences which have been combined by the channel between said transmit elements and said receiver; and a baseband signal processing unit receiving said matched filtered signals as an input and developing therefrom reconstructed versions of said symbols derived from each of said data substreams.

40. The invention as defined in claim 39 wherein said receiver is a minimum mean square error receiver.

41. The invention as defined in claim 39 wherein said matrix multiplier multiplies from the left an L by 1 vertical vector d formed by versions of said preprocessed signals derived from said received signal by a matrix $H^\dagger$ to produce a new L by 1 vertical vector f so that $f=H^\dagger d$ where $\dagger$ denotes complex conjugate.

42. The invention as defined in claim 41 wherein L=4, and H is the following matrix $$\begin{bmatrix} h_1 & h_2 & h_3 & h_4 \\ -h_2^* & h_1^* & -h_4^* & h_3^* \\ -h_3 & h_4 & h_1 & -h_2 \\ -h_4^* & -h_3^* & h_2^* & h_1^* \end{bmatrix}$$

where $h_i$ is the complex channel coefficient from the $i^{th}$ transmit element to said receiver and all channels are flat faded channels.

43. The invention as defined in claim 41 wherein at least one element of said vertical vector d is formed by versions of said preprocessed signals derived from said received signal that has had the complex conjugate of at least one element thereof substituted for said element.

44. The invention as defined in claim 39 wherein said baseband signal processing unit multiplies a specified matrix W from the left by a vertical vector f made up of said matched filtered outputs supplied by said matrix multiplier to produce a new L by 1 vertical vector r, so that r=Wf.

45. The invention as defined in claim 44 wherein matrix $W=K^{-1}$, where $K=H^\dagger H$.

46. The invention as defined in claim 45 wherein L=4 and said matrix multiplication is performed in two portions, the first portion using the first and third element of vertical vector f and the second portion using the fourth and second element of vertical vector f, specifically in that order and in which a 2×2 matrix employed for the multiplication from the left for both portions is developed by deriving 2×2 matrix K' through deleting the second and fourth rows and columns of 4×4 matrix K where $K=H^\dagger H$ and 2×2 matrix $W'=K'^{-1}$.

47. The invention as defined in claim 44 wherein matrix $W=K^\dagger(K K\dagger+\lambda K)^{-1}$, where $\lambda$ is a real scalar.

48. The invention as defined in claim 47 wherein $\lambda$ is equal to $\sigma_n^2/\sigma_h^2$ where $\sigma_n^2$ is the channel noise variance and $\sigma_h^2$ is the variance of each symbol $b_i$, where i=1 . . . L.

49. The invention as defined in claim 47 wherein L=4 and said matrix multiplication is performed in two portions, the first portion using the first and third element of vertical vector f and the second portion using the fourth and second element of vertical vector f, specifically in that order and in which a 2×2 matrix employed for the multiplication from the left for both portions is developed by deriving 2×2 matrix K' through deleting the second and fourth rows and columns of 4×4 matrix K where $K=H^\dagger H$ and 2×2 matrix $W'=K'^\dagger(K' K'^\dagger+\lambda K')^{-1}$.

50. The invention as defined in claim 39 further comprising L despreaders for developing said versions of said preprocessed signals from said received signal.

51. The invention as defined in claim 39 further comprising a demultiplexer for developing said versions of said preprocessed signals from said received signal.

52. The invention as defined in claim 39 further comprising a selective conjugator for developing said versions of said preprocessed signals derived from said received signal by conjugating at least one element of despread versions of said preprocessed signals derived from said received signal.

53. The invention as defined in claim 39 further comprising a selective conjugator for developing said versions of said preprocessed signals derived from said received signal by conjugating at least one element of subsampled versions of said preprocessed signals derived from said received signal.

54. The invention as defined in claim 39 further comprising L decoders, each of said decoders receiving as an input reconstructed versions of said symbols derived from a respective one of said data substreams and developing therefrom a reconstructed version of said one of said data substreams.

55. The invention as defined in claim 39 further comprising L decoders, each of said decoders receiving as an input reconstructed versions of said symbols derived from a respective one of said data substreams and developing therefrom a reconstructed version of said one of said data substreams.

56. The invention as defined in claim 55 further comprising a multiplexer which receives each reconstructed version of said data substreams from said decoders and develops therefrom a reconstructed version of said source bit stream.

57. The invention as defined in claim 39 further comprising:
a second matrix multiplier for supplying as an output second matched filtered signals which are second versions of preprocessed signals derived from a second received signal which includes versions of said time sequences which have been combined by a second channel between said transmit elements and said receiver; and
a second baseband signal processing unit receiving said second matched filtered signals as an input and developing therefrom second reconstructed versions of said symbols derived from each of said data substreams; and
a combiner for combining said reconstructed versions of said symbols and said second reconstructed versions of said symbols.

* * * * *